United States Patent Office 3,289,496
Patented Dec. 6, 1966

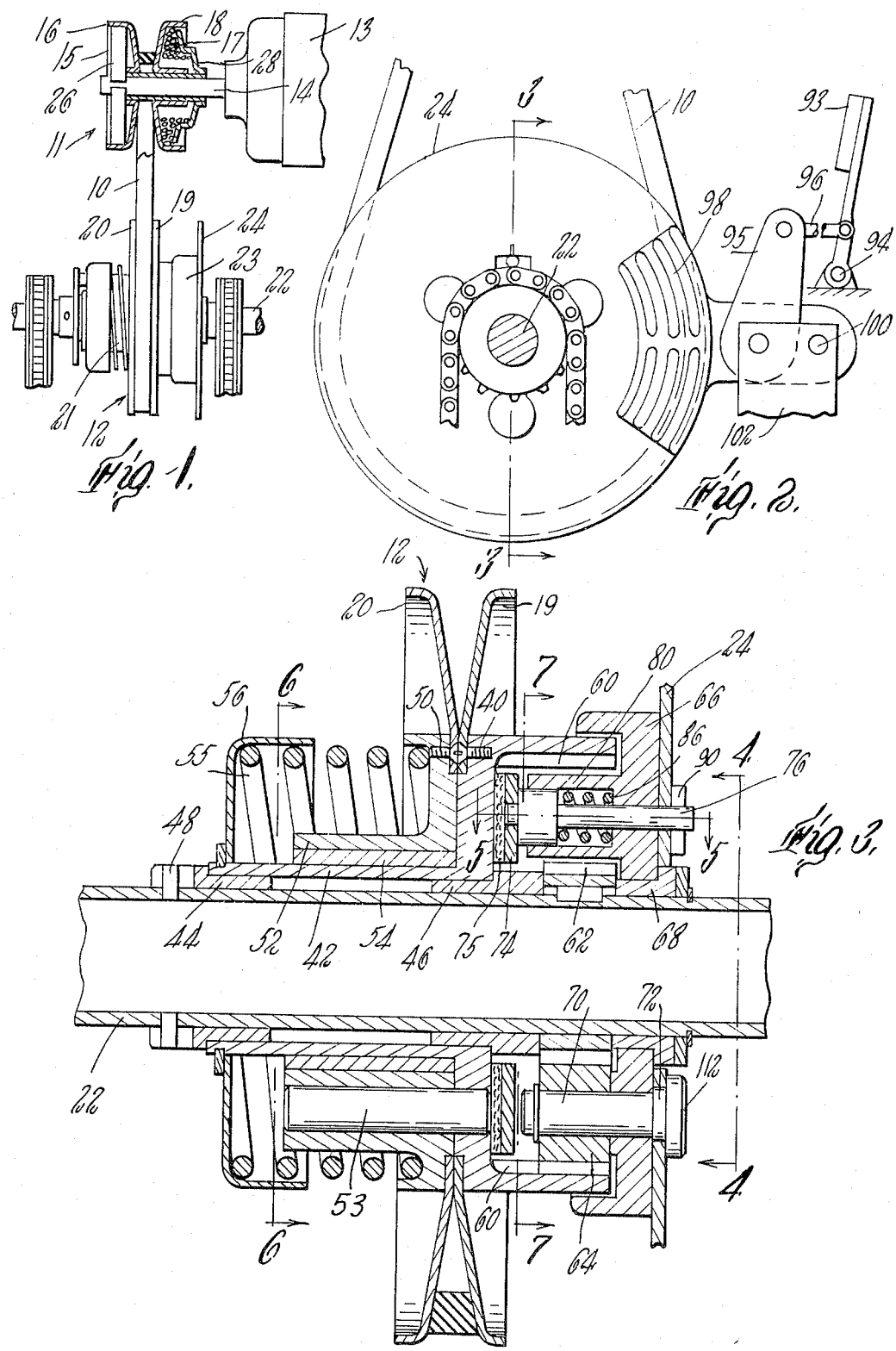

3,289,496
VARIABLE SPEED TRANSMISSION
Walter S. Hoover, Green River Road,
Williamstown, Mass.
Filed June 11, 1964, Ser. No. 374,352
4 Claims. (Cl. 74—689)

The present invention relates to an improved automotive variable speed reversible transmission, and more particularly to an automotive transmission having a variable pitch sheave and V-belt torque converter including an improved reversing and braking mechanism associated therewith.

The automotive transmission of the present invention is particularly adapted for use with lightweight, self-propelled vehicles such as golf carts, scooters, automobiles, garden tractors, and the like, provided with throttle controlled internal combustion motors. The transmission comprises generally a centrifugal, self-energizing clutch, a variable speed torque converter comprising a V-belt and driving and driven variable pitch supporting sheaves rotatable on parallel axes, a driven element of said transmission supported coaxially with the driven sheave, and braking and reversing mechanism forming an integral unit with the driven sheave and driven element of the transmission. Automatic control of the torque converter is effected by means of a fluid ball control means constructed and arranged to exert a bias upon the driving sheave to the high pitch position which is at a maximum for the relatively separated low speed low pitch position of the elements of the driving sheave, said bias being gradually reduced to a minimum as the movable element of the sheave is shifted to the high pitch position. The fluid ball biasing device referred to is illustrated, for example, in the U.S. Patent No. 2,802,367, issued August 13, 1957, to Walter S. Hoover. However, it should be understood that this receiver driven brake reversing sheave will also work with other types of torque converters.

It is a principal object of the invention to provide an improved variable speed automotive transmission of the general type referred to having a reversing and braking mechanism mounted integrally therewith and a manual control therefor, whereby full load and torque responsive characteristics of the converter unit are made available over the entire range of speeds for both forward and reverse.

It is a further object of the invention to provide a simplified and improved reversible variable speed automotive transmission unit for use in small vehicles such as scooters, garden trucks, and the like, which is of simple and compact construction and is adapted to be readily and conveniently controlled for starting, stopping and reversing by means of a single brake pedal which operates in combination with the usual engine throttle control for such vehicles.

With the above and other objects in view as may hereinafter appear the several features of the invention consist in the devices, combinations and arrangement of parts hereinafter described and claimed which together with the advantages to be obtained thereby will be readily understood by one skilled in the art from the following description taken in connection with the accompanying drawings, in which:

FIG. 1 is a side view on a small scale of a reversible ball fluid controlled belt-type torque converter transmission suitable for scooters and other small vehicles;

FIG. 2 is a detail view on a larger scale of the brake controlled reversible driven unit of the torque converter assembly including a foot treadle operated brake;

FIG. 3 is a sectional view of the driven unit of the V-belt torque converter including the brake controlled reversible gearing taken on a line 3—3 of FIG. 2;

Figure 4:
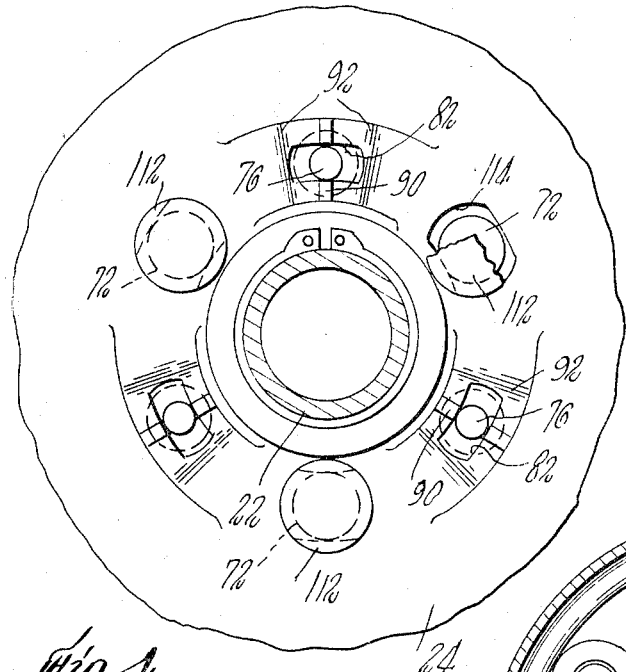
FIG. 4 is an end view looking from the right of the driven unit as shown in FIG. 3, being taken on a line 4—4 of FIG. 3.
Figure 5:
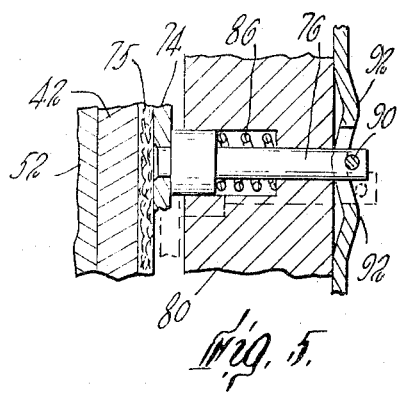
FIG. 5 is a detail sectional view taken on a line 5—5 of FIG. 3 illustrating the mechanism controlled by the brake to release the friction clutch in the planetary gearing for operating same in reverse.
Figure 6:
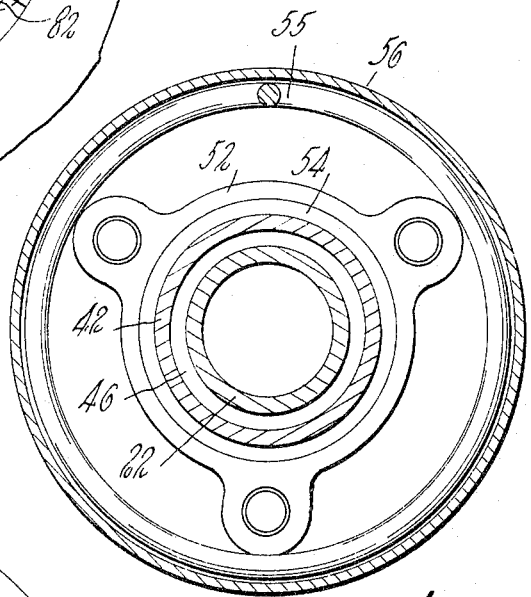
FIG. 6 is a sectional view taken on a line 6—6 of FIG. 3 looking from the left illustrating particularly the movable driven sheave element of the V-belt torque converter.
Figure 7:
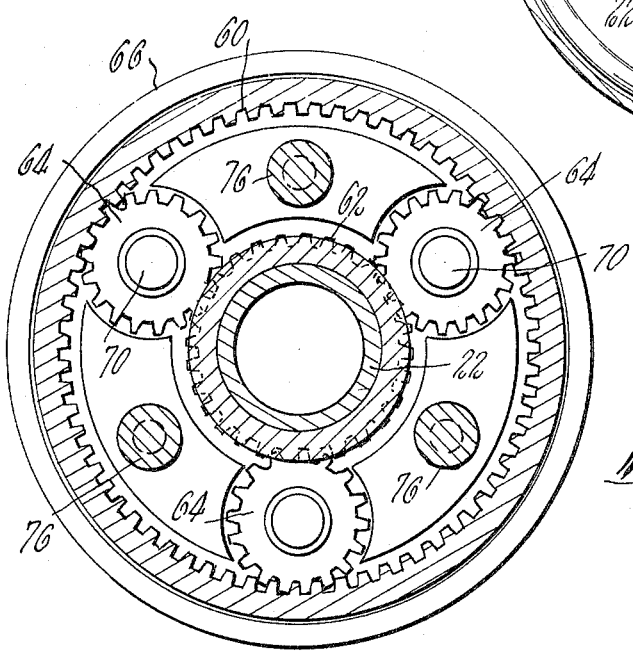
FIG. 7 is a detail sectional view taken on a line 7—7 of FIG. 3 of the reversible planetary gearing embodied in the driven unit of the transmission.

The automotive variable speed reversible transmission illustrated in the drawings as embodying in a preferred form the several features of the invention comprises as generally shown in FIG. 1 a variable speed torque converter including a V-belt 10 which rides on a variable pitch driving sheave 11 and a variable pitch driven sheave 12. Power is transmitted to the driving sheave 11 from an internal combustion motor diagrammatically indicated at 13 through a shaft 14 and a centrifugal self-energizing automatic clutch 15 to an axially fixed driving sheave element 16. Fluid ball control means generally indicated at 17 is arranged to impart a variable axial thrust against a movable element 18 of the driving sheave 11 for biasing the torque converter to the high pitch position. The driven sheave 12 is comprised of an axially fixed driven sheave element 19 and an axially shiftable sheave element 20 which is biased inwardly to the low pitch position for the entire unit by means of a compression spring 21. The drive is imparted from the relatively fixed driven sheave element 19 to a driven shaft 22 coaxial therewith through reversible planetary gearing generally designated at 23 which is controlled by the operation of a foot treadle and disc brake mechanism generally designated at 24.

The automatic centrifugal, self-energizing clutch 15 comprises a pair of semi-cylindrical brake members 26 which are weighted to move radially outwardly from the shaft 14 against a clutch face formed in a flanged outer edge of the driving sheave element 16. The brake elements 26 are biased inwardly by spring means, not shown, and are forced outwardly by centrifugal force developed by the rotation of drive shaft 14. Inasmuch as this brake mechanism is well known and forms specifically no part of the invention, no further description is believed necessary.

The ball fluid means 17 above referred to consists of a mass of small steel balls confined in an enclosure provided by the movable sheave 18 and a stationary end support 28 axially fixed with relation to the drive shaft 14. The arrangement is such that when the movable sheave element is in the normally separated low pitch position of FIG. 1 the ball fluid 17 is expanded inwardly covering a relatively large surface area of the sheave element 18. As the rotational rate of the drive shaft 14 is increased and as the variable speed belt drive is shifted to the high pitch driving position in which the movable driving sheave element 18 is moved to the left the ball fluid is massed outwardly toward the peripheral edge of its enclosure thus covering a relatively smaller area of the movable sheave element 18 so that a lower axial thrust is imposed on the shaft element tending to hold the torque converter in the high pitch position.

The driven sheave 12 of the variable speed torque converter forms part of a unit carried on driven shaft 22 which includes reverse gearing generally designated at 23 and the manually operable disc brake mechanism 24. As shown particularly in large scale FIG. 3, the axially fixed driven sheave element 19 is secured by screws 40 to a flanged portion of a sleeve 42 rotatably mounted on bushings 44 and 46 on the driven shaft 22. The sleeve 42 is supported against axial movement in one direction against a sleeve portion of the bushing 44 which is in turn secured by a pin 48 to the driven shaft 22. Movement of the sleeve 42 in the other direction is generally blocked by engagement of the bushing 46. The cooperating driven sheave element 20 is secured by screws 50 to the flanged end of a sleeve 52 slidably mounted on a bushing 54 on sleeve 42. A plurality of torsion pins 53 projecting from apertures in the flanged portion of sleeve 42 disposed about and parallel to the axis of shaft 22 are slidably fitted into corresponding holes in sleeve 52 so that the two sleeves 42 and 52 and sheave elements 19 and 20 attached thereto are keyed to turn as a unit. The sleeve 52 and driven sheave element 20 are biased axially against the axially fixed sheave element 19 by means of a coil spring 55 seated at one end against the flanged end of the sleeve 52 and at its other end against a relatively fixed cover member 56.

The arrangement of the expandable and contractible driving and driven sheaves 11 and 12 and of the V-belt 10 is such that when the belt is in the minimum diameter position with respect to the driving sheave 11 it will be located at the maximum diameter position with respect to the driven sheave 12 as shown in FIG. 1. This is the minimum pitch low speed driving position of the torque converter. An inward movement of the shiftable sheave element 18 of the driving sheave unit gradually increases the diameter of the sheave about which V-belt 10 passes, while at the same time the movable sheave element 20 of the driven sheave 12 moves away from the fixed sheave element 19, decreasing the effective diameter of driven sheave 12 with a corresponding increase of pitch or driving ratio of the torque converter. An infinite number of settings of the torque converter is thus provided for maximum torque low speed, to a low torque high speed position.

The pitch ratio position of the V-belt 10 with respect to the driving and driven sheaves at any given instant is determined by the interplay of a number of factors which include the relatively unchanging pressure of the spring 55 against movable driven sheave element 20 tending to shift the V-belt 10 to the high torque low speed position, the pressure of the ball fluid 17 against the movable driving sheave element 18 which increases as the ball fluid is pressed inwardly for the low pitch ratio position of the torque converter of FIG. 1 thereby increasing the contact area with the face of the movable sheave element 18, and decreases as the ball fluid is shifted radially outwardly for the high speed low torque position of the torque converter of FIG. 1, thereby engaging a reduced face area of the movable driving sheave element 18. The position of the torque converter is influenced also by the torque delivered by the motor, and the load imposed on the driven shaft 22. It will be noted, for example, that for the stop position of the torque converter, the constant pressure spring 55 causes the V-belt of the torque converter to assume the maximum torque low speed position of FIG. 1.

The steel ball fluid loading of the expansible and retractable driving sheave unit affects the operation of the torque converter unit in the following manner. The construction of the chamber in which the ball fluid is confined is such that the only effect of centrifugal pressure on the steel balls produced by rotation of the unit is in an axial direction tending to shift the driving sheave unit to a closed large diameter maximum driving ratio position. The pressure produced depends upon the area of the movable sheave element 18 against which the fluid balls are directed. Thus for the starting low pitch small diameter position of the converter shown in FIG. 1 a maximum force is exerted in a direction to shift the converter unit to the high pitch position. In the high pitch position of the driving unit on the other hand a minimum area of the sheave 18 is engaged by the ball fluid with the result that a minimum force is applied to shift the V-belt to the high speed ratio position.

In the illustrated construction the shaft 22 is connected to be driven from the driven torque converter sheave 12 in either direction by means of reversible planetary gearing controlled from a brake pedal for the vehicle. The reversible gearing comprises an internal driving gear 60 formed on a tubular extension of the sleeve support 42 for driven sheave element 19, a driven gear 62 keyed to the tubular driven shaft 22, and a group of three planetary gears 64 carried on a generally disc-shaped gear cage 66 supported to turn on a sleeve bushing 68 on the shaft 22. Each of the planetary gears 64 is mounted on a short bearing shaft 70 which extends through the gear cage 66 and is formed at its outer end with an enlarged head 72.

The gear cage 66 is normally frictionally engaged to turn with the driving gear 60 by means of an annular brake ring 74 having a friction lining 75 and supported from the gear cage 66 by means of three plungers 76 slidably supported within tubular extensions 80 formed on the inner face of the gear cage 66 at spaced intervals about the axis thereof intermediate the bearing shafts 70 for planetary gears 64. Each plunger 76 is formed with an enlarged head to which the annular clutch ring 74 is attached and a stem which extends through the gear cage 66 and through a slot 82 formed in the brake disc 24 hereinafter more fully to be described. A spring 86 coiled about the stem of each plunger 76 and seated at one end against the base of the cylindrical recess 80 and at its other end against the enlarged head of the plunger biases the annular brake ring 74 inwardly so that the friction brake lining 75 is engaged against the flanged portion of the driven sheave supporting sleeve 42. At its outer end the stem of each plunger 76 is provided with a cross pin 90 which is adapted for engagement with a cammed surface 92 formed in the outer face of the brake disc 24.

The brake disc 24 above referred to forms part of a pedal controlled disc brake mechanism which is employed to brake the movement of the vehicle and also to control the direction of drive through the reversible planetary gearing above described. As shown in FIG. 2, a brake pedal 93 pivoted at 94 on the vehicle is connected by a link 96 with an actuating cam lever 95 forming part of a braking unit which comprises a pair of braking elements, one of which is shown at 98, adapted to be brought into frictional engagement with opposed faces of the brake disc 24 and having rearwardly extending arms which are loosely supported on bolts 100 carried on an intervening holder plate 102. The brake arms are forced toward one another into braking engagement with the intervening brake disc 24 by the cam lever 95 which is pivoted on a cross bolt 100 passing through the brake arms and intervening holder plate from one side to the other of the braking unit. Inasmuch as disc braking mechanisms of this general type are well known in the art and as the particular disc brake employed forms specifically no part of the present invention, no further illustration or description thereof is believed necessary.

The brake disc 24 is supported adjacent the planetary gear cage 66 to rotate therewith on the driven shaft 42 and for a limited relative movement to the gear cage 66, being held in a position against the gear cage by circular cover discs 112 which are attached to and overlie the enlarged head 72 of the bearing shafts 70 for the planetary gears 62. The enlarged heads 72 of the bearing shafts 70 engage in elongated slots 114 formed in the brake disc 24 which permit a limited rotational movement only of the brake disc 24 relative to gear cage 66. Further, as previously noted the brake disc is supported normally in an intermediate position relative to the gear cage 66 by the engagement of the cross pins 90 against the cammed surfaces 92 formed on the outer face of a brake disc 24.

The operation of the variable speed reversible torque converter herein disclosed as applied to a gasoline motor for driving a small vehicle such as a scooter or the like is as follows:

It is assumed that the vehicle is at rest, and that the motor throttle is in closed idling position. The automatic clutch 15 is disengaged. The variable speed belt converter comprising the belt 10 is in the maximum torque low pitch position, the cooperating elements 16 and 18 of the driving sheave being fully separated and the cooperating elements 19, 20 of the driven sheave being fully contracted under the influence of control spring 55. It is assumed that the brake pedal 93 is fully released so that the brake disc 24 can adjust itself rotatably through engagement of the follower pins 90 with the cammed surfaces 92 of the disc 24 to permit the engagement of clutch element 74, 75 under the influence of springs 86. The planet gear cage 66 is thus clutched to the driving gear 60 of the planetary transmission, the planet gears 64 being thus locked in position so that rotation of the driven sheave 19, 20 of the torque converter will effect a positive drive of the driven shaft 22 from the planetary driving element 60 through the relatively fixed planet gears 64 and driven gear 62. In order to drive the shaft 22 and vehicle driven thereby in a forward direction the operator has only to open the engine throttle thus increasing the motor speed and causing the automatic clutch 15 to engage. The drive is now transmitted through the variable speed torque converter, the sheave pitch being controlled by the interaction of a number of factors which include the acceleration of the driving motor, the pressure of spring 55 tending to bring together the driven sheave elements 19, 20, the load factor imposed on the driven shaft 22 and the variable ball fluid pressure operating against the movable driving sheave element 18 tending to increase the pitch or speed ratio of the sheaves in accordance with the load on the engine. In order to arrest the rotation of shaft 22 and the vehicle driven thereby the operator permits the motor throttle to close and pushes upon the brake pedal 93 thus applying a braking pressure against the brake disc 24. The driven gear 62, impelled by the momentum of the vehicle and acting through shaft 22 continues to rotate, carrying with it the gear cage 66 and planet gears 64 still locked by engagement with the internal driving gear 60 which is thus rotated relative to the braked disc 24, causing the cam follower pins 90 to move onto the cam surfaces 92, and so to release the clutch 74, 75. The strength of the springs 86 is adjusted so that a substantial braking pressure is applied through the braking disc 24 to effect the stopping of the vehicle before the clutch 42 is disengaged. The braking action is further reinforced by the resistance encountered in the torque converter itself as a result of the continued forward momentum of the driven gear 62 and vehicle connected shaft 22.

The operation of the mechanism to effect reversal of the driven shaft 22 and vehicle driven thereby is as follows:

It is assumed that the throttle of the engine has been closed to idling speed so that the automatic clutch 26 of the torque converter is disengaged, the torque converter is at rest, and forward movement of the driven shaft 22 and vehicle has been stopped. Upon operating the braking and reverse pedal 92, the disc brake is applied providing a resistance which effectively prevents rotation of the brake disc 24. When the throttle is now opened up, automatic clutch 26 acts to drive the converter including the driven sheave element thereof, the transmission drive gear 60 and the planetary gear cage 66 in the forward direction. The gear cage 66 is thus displaced relative to the brake disc 24 sufficiently so that the cam follower pins 90 will ride onto the high portions of the surface cams 92 in brake disc 24 to disengage the clutch 74, 75. The cage 66 carrying planet gears 64 is thus disconnected from the driven sleeve element 42 of driven sheave 19, 20, and is held stationary by the continued application of the brake pedal 93 acting through brake disc 24. The drive in the reverse direction is now effected through the internal gear 60, through planet gears 64 rotating about fixed axes, and driven gear 62 driven by the planet gears in the reverse direction. With this arrangement the operation of the vehicle in reverse is subject to control by the torque converter which changes its pitch position as a result of interplay of the several acceleration, load and other factors in the same manner as for the forward direction of rotation.

It will be understood that applicant's improved variable speed reversible transmission, in which the reverse mechanism is integrated with the driven sheave and is controlled by a pedal actuated friction brake mechanism, will operate effectively independently of whether the engine throttle is opened or closed, so that failure to slow down before applying the reverse pedal can do no harm, and is in fact of considerable advantage, where the vehicle may be stuck in snow or mud, to permit a rapid rocking of the vehicle back and forth without closing the throttle to declutch before reversing.

The invention having been described what is claimed is:

1. In a variable speed reversible automotive transmission for a throttle controlled motor driven vehicle, the combination with a drive shaft and a driven shaft of a torque converter comprising a V-belt, a variable pitch driving sheave comprising an axially fixed and an axially adjustable driving sheave element rotatably mounted on said drive shaft, and an axially fixed and an axially adjustable driven sheave element rotatably mounted on said driven shaft, a centrifugally controlled driving clutch connected between the drive shaft and said axially fixed driving sheave element, ball fluid biasing means comprising ball fluid, and a housing directing said ball fluid against an axially disposed biasing surface area of said movable driving sheave element, said biasing area diminishing with movement of said movable sheave element from low pitch to high pitch position, means biasing said driven movable sheave element to the low pitch position, braking and reversing means connected between said axially fixed driven sheave element and said driven shaft comprising an internal driving gear connected to turn with said axially fixed driven sheave element, a driven gear connected to turn with said driven shaft, a planet gear cage, planetary gears carried by said cage engaging said driving and driven gears respectively, a friction clutch element on said gear cage for engagement with said driven sheave element, a brake member supported coaxially with and for a limited rotational movement relative to said gear cage, means normally engaging said friction clutch, and means actuated by a relative movement of said brake member and gear cage upon application of said brake to release said clutch.

2. In an automatic variable speed reversible transmission comprising a V-belt, and driving and driven variable pitch V-belt supporting sheaves rotatable on parallel axes, and a driven element of said transmission supported coaxially with said driven sheave, the combination of breaking and reversing mechanism connected between said driven sheave and said driven element comprising an internal driving gear integral with said driven sheave, a driven external gear secured to turn with said driven element and spaced inwardly of said internal driving gear, planet gears interposed between and meshing with said driving and driven gears, and a planet gear cage freely rotatable on said axis, a manually operable friction braking device for arresting rotation of the planet gear cage including a friction disc supported coaxially with said cage and connected for limited rotational movement from a neutral position relative to said cage, an annular friction clutch element on said driven sheave, a cooperating friction clutch element supported to rotate with and for movement axially of said cage against said first-mentioned clutch element, cam and follower connections between said cooperating friction clutch element and said friction disc actuated by a relative rotational movement of the friction disc and cage from said neutral position to disengage said friction clutch elements, and biasing means acting on said cam and follower connection to engage said clutch elements and to return said disc and cage to said neutral position.

3. In an automatic variable speed reversible transmission comprising a V-belt, and driving and driven variable pitch V-belt supporting sheaves rotatable on parallel axes, and a driven element of said transmission supported coaxially with said driven sheave, the combination of breaking and reversing mechanism connected between said driven sheave and said driven element comprising an internal driving gear integral with said driven sheave, a driven external gear secured to turn with said driven element and spaced inwardly of said internal driving gear, planet gears interposed between and meshing with said driving and driven gears, and a planet cage freely rotatable on said axis, a manually operable friction braking device for arresting rotation of the planet gear cage including a friction disc supported coaxially with said cage and connected for limited rotational movement relative to said cage, an annular friction clutch element on said driven sheave, a cooperating friction clutch element axially shiftable on said cage against said first-mentioned clutch element, biasing means acting on said friction clutch element to frictionally engage said friction clutch element, and a cam and follower connection between said cooperating clutch element and said braking disc rendered operative by relative movement of said gear cage and braking disc element in either direction from an intermediate neutral position to disengage said friction clutch elements.

4. In an automatic variable speed reversible transmission for a throttle controlled motor driven vehicle having with a drive shaft, and a driven shaft, a torque converter comprising a V-belt, and variable pitch driving and driven sheaves mounted respectively on said driving and driven shafts, the combination of braking and reversing mechanism connected between said driven sheave and said driven shaft comprising a driving gear supported to turn with said driven sheave, a driven gear supported to turn with said driven shaft, planet gears interposed between and meshing with said driving and driven gears, and a planet gear cage freely rotatable on the same axis with said driven shaft, a manually operable friction braking device for arresting the rotation of said planet gear cage including a braking element connected with said gear cage for limited rotational movement of the braking element relative to the gear cage in each direction from a neutral intermediate position, a manually operable braking pedal, and friction means actuated thereby to arrest said braking element, a friction clutching device interposed between said driven sheave and said planet gear cage, control means actuated by movement of said braking element relative to the gear cage from said neutral position for disengaging said friction clutch, and biasing means connected with said friction clutch biasing said clutch to the engaged position, and connected with said braking element biasing said braking element to the neutral position.

References Cited by the Examiner

UNITED STATES PATENTS

| 1,031,988 | 7/1912 | Draullette | 74—218 X |
| 2,745,297 | 5/1956 | Andrus | 74—689 |
| 2,810,462 | 10/1957 | Ransom | 192—36 |
| 3,158,241 | 11/1964 | Bloom | 192—32 X |

FOREIGN PATENTS 879,241  10/1961  Great Britain.

DAVID J. WILLIAMOWSKY, *Primary Examiner.*

J. A. WONG, *Assistant Examiner.*